Patented May 30, 1939

2,160,413

UNITED STATES PATENT OFFICE 2,160,413

POLYIODO DERIVATIVES OF ACYLAMINO ACIDS AND THEIR SALTS AND A METHOD OF MAKING THE SAME

Max Dohrn, Berlin-Charlottenburg, and Paul Diedrich, Finkenkrug, Germany, assignors to Schering Aktiengesellschaft, a corporation of Germany No Drawing. Application January 15, 1937, Serial No. 120,752. In Germany April 16, 1935

12 Claims. (Cl. 260—518)

This invention relates to a process for the manufacture of di- and tri-iodo derivatives of acylamino acids and their salts as well as to these compounds themselves.

In accordance with the present invention the di- and tri-iodo derivatives of hippuric acid and other acyl-amino acids can be obtained in a simple manner and good yield. The process of the invention consists in the interaction of the corresponding iodine substituted acid halogenides, such as chlorides, preferably dissolved in organic solvents, with amino acids in the presence of basic agents such as alkali solution.

As acid chloride there is employed preferably the di-iodo or tri-iodo benzoyl chloride, but also other substituted benzoyl chlorides can be used which in addition to the iodine atoms contain further substituents as, for example, hydroxy, alkoxy, amino and the like groups. One is also not limited to the application of aromatic iodine substituted carboxylic acids but can employ other carboxylic acids as reaction components, as, for example, di-iodo hydroxy pyridine carboxylic acids and others.

As amino acid component not only aliphatic amino acids such as glycocoll, sarcosine, alanine, and the like can be caused to interact with the said acid chlorides, but also aromatic and heterocyclic or aromatic-heterocyclic amino compounds such as amino-benzoic acid, tryptophane and the like.

The solvents in which the acid chlorides are dissolved for the interaction can be miscible or non-miscible with water. It has been found that acetone and benzene can be employed in the same manner.

The compounds obtained are very suitable for diagnostic and therapeutic purposes, for exampde, for internal and external disinfection. Obviously in the selection of the components one must take into account in addition to their easy availability their compatibility. Thus, for example, the di- and tri-iodo derivatives of hippuric acid are the compounds which come into question chiefly for the present purpose. The substances are difficultly soluble but form more easily soluble salts, as, for example, alkali metal salts and salts of organic bases, for exampe, with alkyl amines and alkoxy amines and so on and are suitably brought into application in the form of these salts.

The following examples serve to illustrate the invention:

EXAMPLE 1

*3,5-di-iodo hippuric acid*

10 grams of 3,5-di-iodo benzoyl chloride (prepared by treatment of 3,5-di-iodo benzoic acid with thionyl chloride) are dissolved in 10 ccs. of benzene and shaken for one hour at ordinary temperature with a solution of 7 grams of glycocoll in 150 ccs. of normal caustic soda solution. The difficultly soluble sodium salt of the 3,5-di-iodo hippuric acid is filtered with suction, dissolved in much water, filtered and precipitated with acetic acid at 40° C. The precipitate is recrystallised from 50% alcohol. The acid forms leaflets and flat needles of melting point 213° C.

By treatment of the acid with the calculated quantity or normal caustic soda or caustic potash solution or with corresponding quantities of organic bases there are obtained after exaporation of the water the corresponding neutralization products, i. e. their salts.

EXAMPLE 2

10 grams of 3,4,5-tri-iodo benzoyl chloride (prepared by boiling 3,4,5-tri-iodo benzoic acid for several hours with thionyl chloride) are dissolved in acetone and, with shaking, a solution of 6 grams of glycocoll in 120 ccs. of normal caustic soda solution is added. When the interaction is complete the difficultly soluble sodium salt of the 3,4,5-tri-iodo hippuric acid is filtered with suction, suspended in much water and the free acid caused to separate by acidification with acetic acid in the hot as a voluminous precipitate which, however, soon becomes crystalline. Recrystallised from dilute alcohol the 3,4,5-tri-iodo hippuric acid forms colorless needles of melting point 241° C.

In the same manner as described in Example 1 there can be produced from this acid the corresponding salts.

EXAMPLE 3

*3,5-di-iodo-benzoyl-α-amino-butyric acid*

10 grams of 3,5-di-iodo benzoyl chloride are dissolved in 10 ccs. of benzene and shaken for one hour at ordinary temperature with a solution of 8 grams of α-amino butyric acid in 150 ccs. of normal caustic soda solution. The separated sodium salt is worked up as described in Example 1. Recrystallised from dilute alcohol the acid forms colorless needles of melting point 239° C.

EXAMPLE 4

*3,5-di-iodo-benzoyl-β-alanine*

This acid is obtained as described in Example 3 by the use of 7 grams of β-alanine instead of 8 grams of α-amino-butyric acid. It forms after recrystallisation from dilute alcohol needles of melting point 199° C.

EXAMPLE 5

*3,4,5-tri-iodo-benzoyl-α-amino-butyric acid*

The difficultly soluble sodium salt of the acid is obtained when a benzene solution of 10 grams of 3,4,5-tri-iodo benzoyl chloride is shaken with a solution of 7 grams of α-amino butyric acid in 150 ccs. of normal caustic soda solution. The free acid obtained from the sodium salt melts after recrystallisation from alcohol with decomposition at 235° C.

EXAMPLE 6

*3,4,5-tri-iodo-benzoyl-sarcosine*

8 grams of sarcosine are shaken in alkaline solution for about one hour with 10 grams of tri-iodo benzoyl chloride dissolved in acetone. The solution freed from acetone is acidified and the precipitate obtained recrystallised from alcohol. The 3,4,5-tri-iodo-benzoyl-sarcosine melts at 117° C.

EXAMPLE 7

*2,4-di-iodo-hippuric acid*

10 grams of 2,4-di-iodo-benzoyl chloride (prepared by treatment of 2,4-di-iodo-benzoic acid with thionyl chloride) are treated as described in Example 1 with glycocoll. Corresponding working up produces the 2,4-di-iodo hippuric acid after recrystallisation from dilute alcohol in the form of colorless needles of melting point 209° C.

Of course, many changes and variations in the reaction conditions, the agents used and the like may be employed by those skilled in the art in accordance with the principles set forth herein and in the claims annexed hereto.

What we claim is:

1. In a process for the manufacture of poly-iodo derivatives of a member of the group consisting of acylamino acids and their neutralization products, the step which comprises reacting a member of the group consisting of di- and tri-iodo aromatic acyl halogenides with an amino acid in the presence of a neutralizing agent.

2. Process as claimed in claim 1, in which the halogenide is employed in solution in an organic solvent.

3. Process as claimed in claim 1, wherein the basic agent is an alkali metal hydroxide.

4. Process as claimed in claim 1 including the step of reacting the product with an acid capable of liberating the free acylamino acid.

5. A process according to claim 1, wherein the aromatic acyl halogenide contains also a substituent of the group consisting of hydroxy, alkoxy and amino groups.

6. Process for the manufacture of poly-iodo derivatives of hippuric acid, comprising treating a member of the group consisting of di- and tri-iodo benzoyl chlorides of the formulas

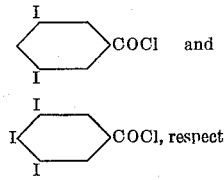

with glycocoll in the presence of a neutralizing agent.

7. Process as claimed in claim 6, in which the halogenide is employed in solution in an organic solvent.

8. Poly-iodo derivatives of aromatic acylamino acid compounds having at least 2 but no more than 3 iodine atoms in their molecule and corresponding to the following general formula R.CO.NH.R' wherein R indicates an aromatic hydrocarbon radical containing the iodine atoms while R' represents a member of the group consisting of free and neutralized carboxylic acid radicals.

9. A product as defined in claim 8, wherein R contains an additional substituent of the group consisting of hydroxy, alkoxy and amino groups.

10. A poly-iodo derivative of hippuric acid containing also a substituent of the group consisting of hydroxy, alkoxy and amino groups, the iodine occupying at least two of the 3, 4 and 5 positions.

11. A poly-iodo derivative of hippuric acid, the iodine occupying at least two of the 3, 4 and 5 positions.

12. A di-iodo derivative of hippuric acid, the iodine occupying two of the 3, 4 and 5 positions.

MAX DOHRN.
PAUL DIEDRICH.